(12) United States Patent
Tuomi et al.

(10) Patent No.: US 11,741,653 B2
(45) Date of Patent: Aug. 29, 2023

(54) OVERLAPPING VISIBILITY AND RENDER PASSES FOR SAME FRAME

(71) Applicant: Advanced Micro Devices, Inc., Santa Clara, CA (US)

(72) Inventors: Mika Tuomi, Noormarkku (FI); Ruijin Wu, San Diego, CA (US); Anirudh R. Acharya, San Diego, CA (US); Kiia Kallio, Inkoo As (FI)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/941,433

(22) Filed: Jul. 28, 2020

(65) Prior Publication Data
US 2022/0036629 A1 Feb. 3, 2022

(51) Int. Cl.
*G06T 15/00* (2011.01)
*G06F 9/38* (2018.01)
*G06T 17/10* (2006.01)

(52) U.S. Cl.
CPC .......... *G06T 15/005* (2013.01); *G06F 9/3877* (2013.01); *G06F 9/3887* (2013.01); *G06T 17/10* (2013.01)

(58) Field of Classification Search
None
See application file for complete search history.

(56) References Cited

U.S. PATENT DOCUMENTS

| 2014/0139534 A1* | 5/2014 | Tapply | G06T 15/005 |
| | | | 345/522 |
| 2016/0148424 A1* | 5/2016 | Chung | G06T 11/40 |
| | | | 345/423 |
| 2016/0232645 A1* | 8/2016 | Wang | G06T 1/60 |
| 2017/0256020 A1* | 9/2017 | Sansottera | G06T 15/10 |
| 2020/0020067 A1* | 1/2020 | Liang | G06T 1/20 |

* cited by examiner

*Primary Examiner* — Saptarshi Mazumder
(74) *Attorney, Agent, or Firm* — Volpe Koenig

(57) ABSTRACT

A method of tiled rendering of an image for display is provided which comprises receiving an image comprising one or more three dimensional (3D) objects and executing a visibility pass for determining locations of primitives of the image. The method also comprises executing, concurrently with the executing of the visibility pass, front end geometry processing of one of the primitives determined, from the visibility pass, to be in a first one of a plurality of tiles of the image and executing, concurrently with the executing of the visibility pass, back end processing of the one primitive in the first tile.

20 Claims, 5 Drawing Sheets

OVERLAPPING VISIBILITY AND RENDER PASSES FOR SAME FRAME

BACKGROUND

Graphics processing includes the rendering of a three dimensional (3D) scene onto a two dimensional (2D) screen. The 3D scene is rendered on a display screen, via a graphics pipeline, which includes different stages of processing. Graphics processing commands of a command stream are received (e.g., from an application) and computation tasks are provided (e.g., to an accelerated processing device, such as a GPU) for execution of the tasks.

Graphics are rendered on a display screen using primitives (e.g., triangles, quadrilaterals or other geometric shapes). The graphics processing commands include, for example, the number of primitives, the location of each primitive and attributes of each primitive to be rendered on the display screen.

BRIEF DESCRIPTION OF THE DRAWINGS

A more detailed understanding can be had from the following description, given by way of example in conjunction with the accompanying drawings wherein.

DETAILED DESCRIPTION

Figure 1:
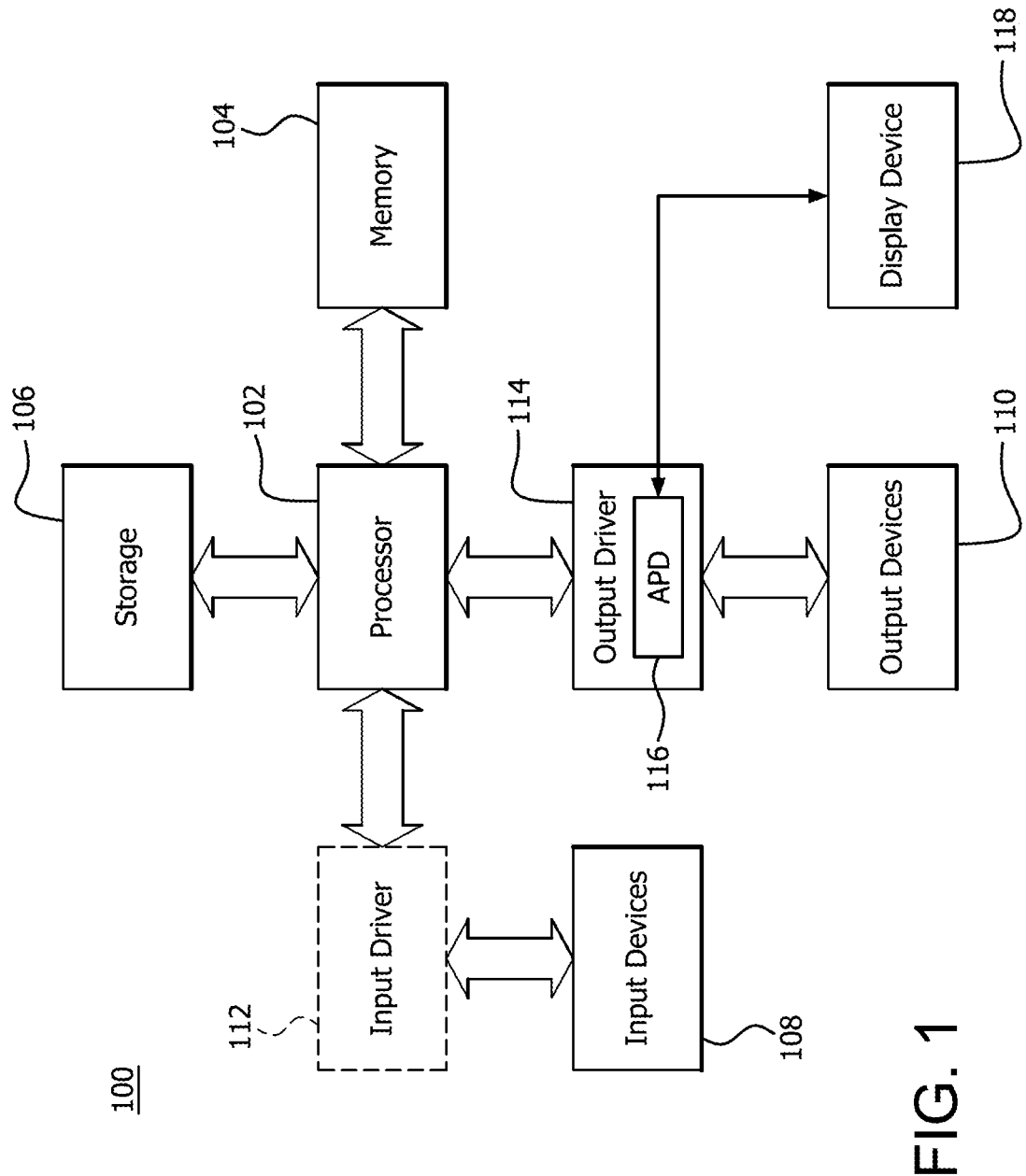
FIG. 1 is a block diagram of an example device in which one or more features of the disclosure can be implemented.

The graphics pipleline can be simplified to include a front end geometry portion and a back end portion. For example, the front end geometry portion of the pipeline includes several shader stages (e.g., vertex shader stage, hull shader stage, tesselator stage, domain shader stage and geometry shader stage). During the shader stages, the primitives are received as 3D objects and transformed to 2D objects to be rendered onto a 2D screen. The back end portion includes a rasterizer stage and pixel shader stage. During the rasterizer stage, an on-screen location of each primitive to be projected onto the 2D screen is determined. For example, during rasterization, an accelerated processing device (e.g., GPU) determines, for each primitive, which pixels (or sub-pixel samples) correspond to each primitive to be rendered onto the 2D screen. During the pixel shader stage, values (e.g., brightness and color) are calculated for the pixels corresponding to the primitives.

The data is processed (e.g., by the GPU) more efficiently by reusing previously processed data that is stored locally (e.g., data stored in cache of GPU) rather than processing the data using remote memory (e.g., main memory). Because primitives or objects are rendered in the order specified by an application, however, reuse of the data may not be available to process each object.

For example, when two objects are to be rendered in order and overlap on a screen, some of the processed data for the first object can be reused to render the second object on the screen because some of the pixels corresponding to the first object also correspond to the second object. When the second object does not overlap with the first object, however, pixels corresponding to the first object do not correspond to the second object and, therefore, the processed data of the first object cannot be reused to render the second object. In addition, if a third object overlaps the first object but is to be rendered after the second object, much of the processed data of the first object will be typically flushed from the cache to make room in the cache to process the data for the second object because the size of the cache is relatively small in order to facilitate efficient processing. Accordingly, the processed data of the first object is no longer in the cache and, therefore, cannot be reused to render the third object.

Tiling (or binning) is a technique which splits the frame into sections (e.g., tiles or bins) and renders one tile of a frame before rendering another tile of the frame. For example, if a frame (or image) is split into four equal tiles (i.e., top left quadrant, top right quadrant, bottom left quadrant and bottom right quadrant), a first tile (e.g., top left quadrant) is rendered before proceeding to render one of the next tiles. Then, one of the other tiles (e.g., top right quadrant) is rendered before proceeding to render one of the last two tiles, and so on, until each of the tiles of the frame are rendered. Therefore, for the scenario described above with three objects of a frame to be rendered, if the third object overlaps with the first object in the first tile, then the data used to render the first object can be used to render the third object because the first and third objects are rendered in order.

Each tile is processed on a pixel granularity and the processor determines, during rasterization, whether or not pixels corresponding to a primitive are located in a tile. Therefore, when the pixels are determined to not be located in one or more tiles during rasterization, the processing for those pixels during the pixel shader stage can be skipped, reducing the amount of work. For example, when an object crosses between two tiles, the pixels of the primitive corresponding to the object located in a first tile can be processed without processing the pixels of the object located in a second tile. Then, when the second tile is processed, the pixels of the object located in the second tile are processed without re-processing the pixels of the object located in the first tile. Accordingly, duplicate processing of pixels is avoided during the pixel shader stage.

Conventional graphics processing techniques incur duplicate data processing (i.e., duplicate work), however, during the vertex shader stage of the graphics pipeline, described in greater below in relation to FIG. 3, because the location of the primitives are not yet known. When a primitive is received by a processor (e.g., by the GPU) during the processing of a current tile, the location (including in which tile the primitive is located) of the primitive to be rendered on the 2D screen is not determined until the primitives for each of the other tiles are processed. For example, during processing of a first tile in which the frame is divided into four tiles, the processor does not determine the locations of any primitives in the first tile until the vertex shader is executed on the first, second, third and fourth tiles. Then, during processing of the second tile, the processer again executes the vertex shader on each of the tiles (i.e., the first, second, third and fourth tiles) to determine locations of any primitives in the second tile. The process is repeated for the third and fourth tiles. Accordingly, duplicate processing (i.e., duplicate work) is incurred because the vertex shader is re-executed on every tile during the processing of each tile. Even worse, the processor still executes the vertex shader for each tile to determine primitive locations in the tile even if a primitive is not located in a tile.

To reduce duplicate data processing, conventional techniques conduct a visibility pass, which runs the vertex shader once for each primitive and then determines, for each primitive, in which tile is the primitive located. After the locations of each of the primitives are determined, for each tile being processed, the primitives, determined to be located in the tile, are processed. For example, if the visibility pass determines that a primitive is in the first tile, but not in the second, third or fourth tiles, the processing of the primitive can be skipped when the second, third and fourth tiles are being processed.

When implementing these conventional techniques, however, before the processor can begin executing vertex shading for any primitives in a first tile, the processor must wait (is idle) until the visibility pass completes for each of the tiles of the frame. Accordingly, this waiting results in inefficiencies in the pipeline, such as increased frame latency.

The present application discloses apparatuses and methods which concurrently executes a visibility pass and front end geometry processing (e.g., vertex shading) of a first tile at a first hardware block (e.g., first SIMD unit) while executing, concurrently with the visibility pass, back end processing (e.g., rasterization and pixel shading) of the first tile at a second hardware block (e.g., second SIMD unit).

The present application provides a method of tiled rendering of an image for display is provided which comprises receiving an image comprising one or more three dimensional (3D) objects and executing a visibility pass for determining locations of primitives of the image. The method also comprises executing, concurrently with the executing of the visibility pass, front end geometry processing of one of the primitives determined, from the visibility pass, to be in a first one of a plurality of tiles of the image and executing, concurrently with the executing of the visibility pass, back end processing of the one primitive in the first tile.

The present application provides a processing device comprising memory and a processor. The processor is configured to receive an image comprising one or more three dimensional (3D) objects and execute a visibility pass for determining locations of primitives of the image. The processor is also configured to execute, concurrently with the executing of the visibility pass, front end geometry processing of one of the primitives determined, from the visibility pass, to be in a first one of a plurality of tiles of the image and execute, concurrently with the executing of the visibility pass, back end processing of the one primitive in the first tile.

The present application provides a non-transitory computer readable medium comprising instructions for causing a computer to execute a method of method of tiled rendering of an image for display comprising receiving an image comprising one or more three dimensional (3D) objects, executing a visibility pass for determining locations of primitives of the image, executing, concurrently with the executing of the visibility pass, front end geometry processing of one of the primitives determined, from the visibility pass, to be in a first one of a plurality of tiles of the image and executing, concurrently with the executing of the visibility pass, back end processing of the one primitive in the first tile.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
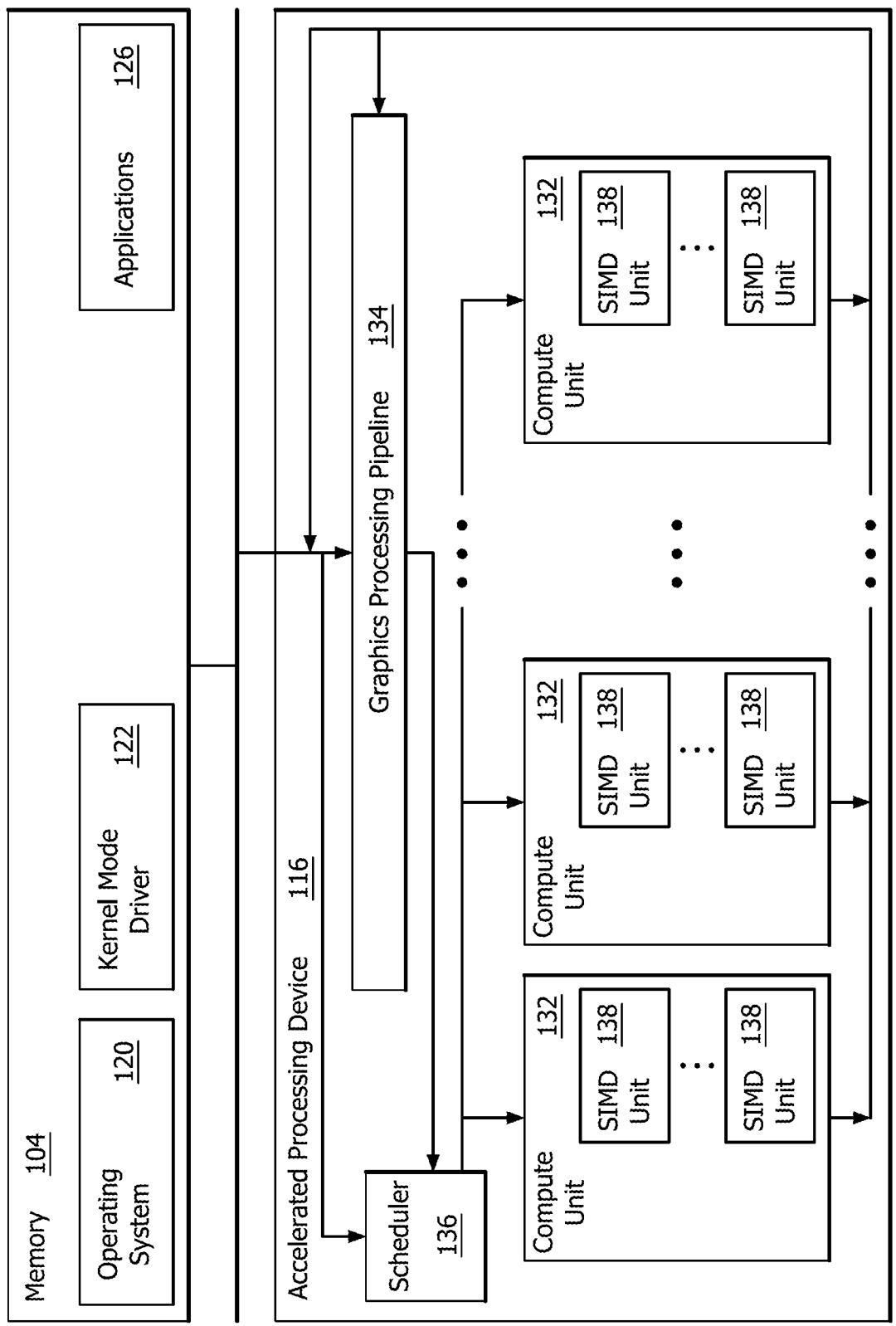
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The APD 116 is configured to implement features of the present disclosure by executing a plurality of functions as described in more detail below. For example, the APD 116 is configured to receive images comprising one or more three dimensional (3D) objects, divide images into a plurality of tiles, execute a visibility pass for primitives of an image and execute, concurrently with the visibility pass, front end geometry processing of a primitive determined to be in a first one of the tiles and execute, concurrently with the visibility pass, back end processing of the primitive in the first tile.

Figure 3:
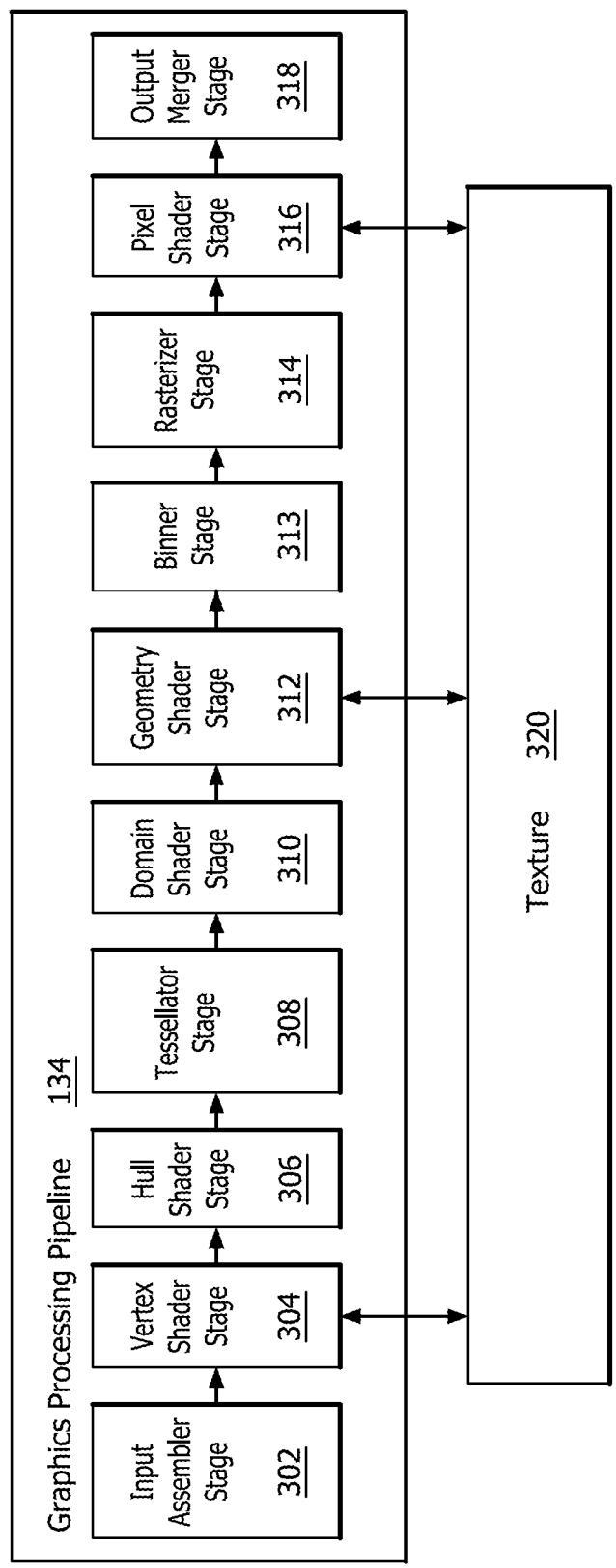
FIG. 3 is a block diagram illustrating a graphics processing pipeline, according to an example.

FIG. 3 is a block diagram showing additional details of the graphics processing pipeline 134 illustrated in FIG. 2. The graphics processing pipeline 134 includes stages that each performs specific functionality. The stages represent subdivisions of functionality of the graphics processing pipeline 134. Each stage is implemented partially or fully as shader programs executing in the programmable processing units 202, or partially or fully as fixed-function, non-programmable hardware external to the programmable processing units 202.

Stages 302 to 313 represent the front end geometry processing portion of the graphics processing pipeline 134. Stages 314 to 318 represent the back end pixel processing portion of the graphics processing pipeline 134.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertexes of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the programmable processing units 202.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. In some instances, a shader program that executes on the programmable processing units 202 perform operations for the geometry shader stage 312.

The binner stage 313 is the last stage of the front end processing. The binner stage performs a coarse rasterization to determine if a tile (or bin) of the frame (or image) overlaps with primitives. For example, the binner stage includes visibility checking (i.e., a visibility pass) and tile walking for the primitives determined to be in each tile. The binner stage 313 is performed by fixed function hardware.

As described above, stages 314-318 represent the back end processing of the graphics processing pipeline 134. The rasterizer stage 314 accepts and rasterizes simple primitives and generated upstream. Rasterization includes determining which screen pixels (or sub-pixel samples) are covered by a particular primitive. For example, the rasterizer stage 314 converts the primitive (e.g., a triangle) to screen space pixels, testing which pixel is covered by the primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel.

Texture data, which defines textures, are stored and/or accessed by the texture unit 320. Textures are bitmap images that are used at various points in the graphics processing pipeline 134. For example, in some instances, the pixel shader stage 316 applies textures to pixels to improve apparent rendering complexity (e.g., to provide a more "photorealistic" look) without increasing the number of vertices to be rendered.

In some instances, the vertex shader stage 304 uses texture data from the texture unit 320 to modify primitives to increase complexity, by, for example, creating or modifying vertices for improved aesthetics. In one example, the vertex shader stage 304 uses a height map stored in the texture unit 320 to modify displacement of vertices. This type of technique can be used, for example, to generate more realistic looking water as compared with textures only being used in the pixel shader stage 316, by modifying the position and number of vertices used to render the water. In some instances, the geometry shader stage 312 accesses texture data from the texture unit 320.

Figure 4:
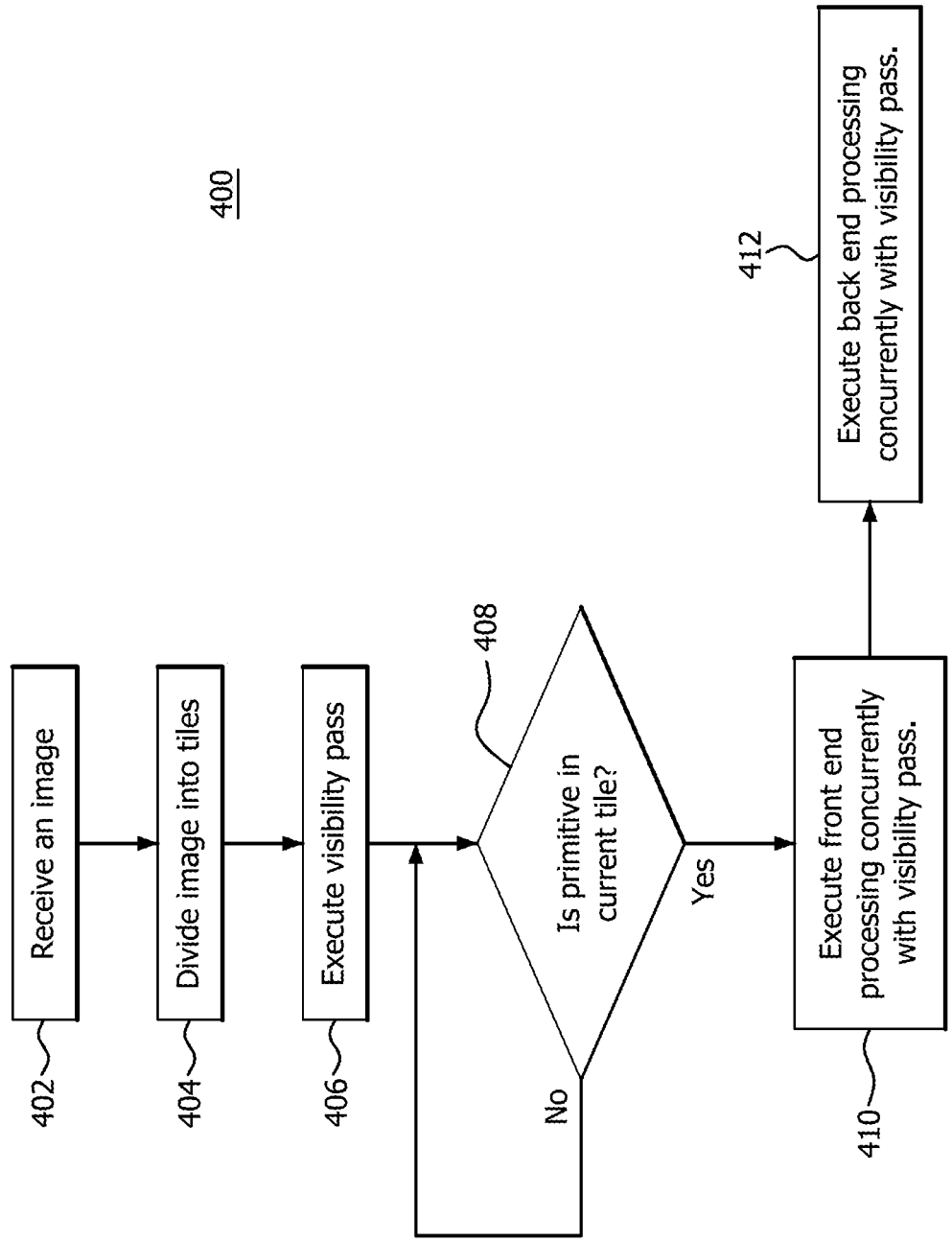
FIG. 4 is a flow diagram illustrating an example method of tiled rendering of an image for display.
Figure 5:
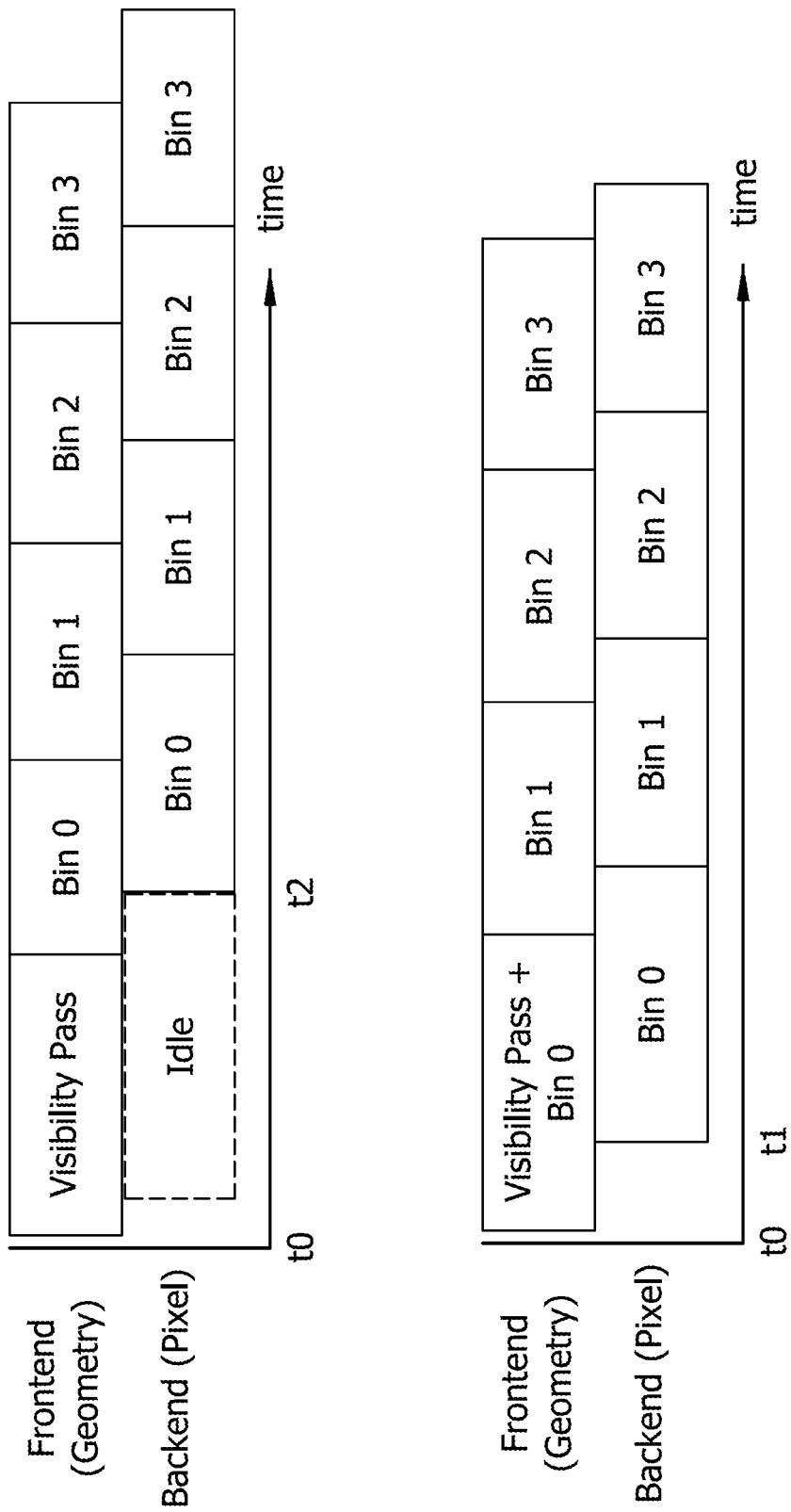
FIG. 5 shows timing diagrams illustrating the performance benefits of implementing features of the disclosure.

FIGS. 4 and 5 are now described together below. FIG. 4 is a flow diagram illustrating an example method 400 of tiled rendering of an image for display. FIG. 5 shows timing diagrams illustrating the performance benefits of implementing features of the disclosure. FIG. 5 illustrates the performance benefits of concurrently executing a visibility pass and front end geometry processing (e.g., vertex shading) of a first tile at a first hardware block (e.g., first SIMD unit) and executing, concurrently with the visibility pass, back end processing (e.g., rasterization and pixel shading) of the first tile at a second hardware block (e.g., second SIMD unit).

In both the top and bottom timing diagrams in FIG. 5, the front end geometry portion (i.e., stages 302 to 313 of the graphics processing pipeline 134) is executed for each tile before proceeding to the next tile, as shown in the bottom rows of each timing diagram. For example, as shown in FIG. 5, the front end geometry portion is executed for the first tile (e.g., top left quadrant) represented as Bin 0 before proceeding to the next tile (e.g., top right quadrant) represented as Bin 1. Then, a third tile (e.g., bottom left quadrant) represented as Bin 2 is processed before proceeding to the fourth tile, (e.g., bottom right quadrant) represented as Bin 4. During the front end geometry portion, primitives (e.g., triangles) are generated to represent the 3D objects to be rendered on the 2D screen.

Likewise, in both the top and bottom timing diagrams in FIG. 5, the back end pixel processing portion (i.e., stages 314 to 318 of the graphics processing pipeline 134) is also executed for each tile before proceeding to the next tile, as shown in the bottom rows of each timing diagram in FIG. 5. During the rasterizer stage, an on-screen location of each primitive to be rendered onto the 2D screen is determined. During the pixel shader stage, values (e.g., brightness and color) are calculated for the pixels corresponding to the primitives.

The top timing diagram in FIG. 5, however, illustrates timing of a processing pipeline in which a processor waits until the visibility pass is completed for each tile before beginning the vertex shading for the primitive and the bottom timing diagram in FIG. 5 illustrates timing of a processing pipeline in which a visibility pass is executed concurrently with the front end geometry processing of a first tile (i.e., Bin 0) and in which the visibility pass is executed concurrently with back end pixel processing of the first tile.

As shown in block 402, the method 400 includes receiving an image comprising one or more 3D objects. For example, the image is received by APD 116. The image can include any number of objects to be transformed for rendering on a 2D display screen.

As shown in block 404, the method 400 includes dividing the image into a plurality of tiles. For simplified explanation, the example shown in FIG. 5 includes the image (or frame) can be split into four equal tiles (i.e., top left quadrant, top right quadrant, bottom left quadrant and bottom right quadrant). The image or frame can, however, be split into any number of tiles. In FIG. 5, the first, second, third and fourth tiles are represented as Bin 0, Bin 1, Bin 2 and Bin 3, respectively.

As shown in block 406, the method 400 includes executing a visibility pass. The visibility pass executes each of the stages 302-313 and determines, for each primitive of the image, in which tile each primitive is located. The visibility pass determines the locations of each primitive in the order in which the primitives are received by an application.

While the visibility pass is executing to determine the locations of each primitive in the order in which they are received, a determination is made as to whether a primitive is located in the first tile (i.e. Bin 0), as shown at decision block 408. When it is determined (e.g., by APD 116) that the primitive received by the application is not located in the first tile, a determination is made as to whether the next primitive is located in the first tile.

When it is determined (e.g., by APD 116) that the primitive is located in the first tile, the APD 116, while still executing the visibility pass for other primitives of the image, begins executing the front end geometry (i.e., stages 302 to 313) for the primitive. That is, as illustrated in the bottom timing diagram of FIG. 5, while the visibility pass is executing, the front end geometry (e.g., vertex shading) processing for the primitive, determined to be in the first tile, is executed concurrently with the visibility pass.

As shown at decision block 412, the method 400 includes executing, concurrently with the visibility pass, back end processing of the primitive in the first tile. For example, when the front end geometry processing (i.e., stages 302-313) is completed for the primitive, the processor executes back end pixel processing of the primitive.

As illustrated in FIG. 5, because the front end geometry processing for the primitive is executed concurrently with the executing of the visibility pass (i.e., while still executing the visibility pass for other primitives of the image) when it is determined that the primitive is located in the first tile rather than wait until the visibility pass is completed for each of the primitives in the image (or frame), the processor begins execution of the front end processing earlier than shown in the top diagram and, therefore, begins the back end processing of the primitive at a time t1 (shown at the bottom timing diagram in FIG. 5), which is earlier than time t2 (shown at the top timing diagram in FIG. 5). Accordingly, the frame latency is reduced.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the APD 116, the scheduler 136, the graphics processing pipeline 134, the compute units 132, the SIMD units 138, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of tiled rendering of an image for display comprising:
    receiving an image comprising one or more three dimensional (3D) objects;
    executing a visibility pass for determining locations of a plurality of primitives of the image in a first single-instruction-multiple-data (SIMD) unit;
    when a determined location of a first primitive of the plurality of primitives is in a first tile of a plurality of tiles, processing, in the first SIMD unit, front end geometry of the first primitive, the front end geometry processing occurring concurrently with the executing of the visibility pass for at least one of a remainder of the plurality of primitives; and
    upon completion of the front end geometry processing of the first primitive, performing, in a second SIMD unit, back end processing of the first primitive, the performing occurring concurrently with the executing of the visibility pass for the at least one of the remainder of the plurality of primitives.

2. The method of claim 1, wherein the method further comprises dividing the image into a plurality of tiles, and
    the visibility pass comprises determining, for the plurality of primitives of each tile in the image, which tile a corresponding primitive is located.

3. The method of claim 2, wherein the visibility pass comprises determining the locations of the plurality of primitives of the image in an order in which the plurality of primitives are received by an application, and
    the location of the first primitive is determined, via the visibility pass, to be in the first tile.

4. The method of claim 2, wherein when the location of the first primitive is determined not to be in the first tile, determine whether a location of a next primitive is in the first tile, and
    when the location of the next primitive is determined to be in the first tile, beginning execution of the front end geometry processing of the next primitive.

5. The method of claim 1, wherein the front end geometry processing comprises vertex shading of the first primitive, and
    the method further comprises executing, concurrently with the visibility pass, vertex shading of the first primitive.

6. The method of claim 1, wherein the method further comprises executing the front end geometry processing of the first primitive while the visibility pass is still executing to determine the location of the at least one of the remainder of the plurality of primitives of the image.

7. The method of claim 1, wherein the back end processing comprises rasterization and pixel shading of the first primitive, and
the method further comprises beginning execution of the back end processing of the first primitive when the front end geometry processing of the first primitive is completed.

8. The method of claim 1, wherein the back end processing comprises rasterization and pixel shading of the first primitive, and
the method further comprises beginning execution of rasterization of the first primitive when the front end geometry processing of the first primitive is completed.

9. A processing device comprising:
memory; and
a processor configured to:
receive an image comprising one or more three dimensional (3D) objects;
execute a visibility pass for determining locations of a plurality of primitives of the image in a first single-instruction-multiple-data (SIMD) unit;
when a determined location of a first primitive of the plurality of primitives is in a first tile of a plurality of tiles, process, in the first SIMD unit, front end geometry of the first primitive concurrently with the executing of the visibility pass for at least one of a remainder of the plurality of primitives; and
upon completion of the front end geometry processing of the first primitive, perform, in a second SIMD unit, back end processing of the first primitive concurrently with the executing of the visibility pass for the at least one of the remainder of the plurality of primitives.

10. The processing device of claim 9, wherein the processor is further configured to divide the image into a plurality of tiles, and
the visibility pass comprises determining, for the plurality of primitives of each tile in the image, which tile a corresponding primitive is located.

11. The processing device of claim 10, wherein the visibility pass determines the locations of the plurality of primitives of the image in an order in which the plurality of primitives are received by an application, and
the location of the first primitive is determined, via the visibility pass, to be in the first tile.

12. The processing device of claim 10, wherein when the processor determines that the location of the first primitive is not in the first tile, the processor determines whether a location of a next primitive is in the first tile, and
when the location of the next primitive is determined to be in the first tile, the processor begins execution of the front end geometry processing of the next primitive.

13. The processing device of claim 9, wherein the front end geometry processing comprises vertex shading of the first primitive, and
the processor is configured to execute, concurrently with the visibility pass, vertex shading of the first primitive.

14. The processing device of claim 9, wherein the processor further executes the front end geometry processing of the first primitive while the visibility pass is still executing to determine the location of the at least one of the remainder of the plurality of primitives of the image.

15. The processing device of claim 9, wherein the processing device is an accelerated processing device and the processor is a compute unit comprising a plurality of SIMD units.

16. The processing device of claim 9, wherein the back end processing comprises rasterization and pixel shading of the first primitive, and
the processor is further configured to begin execution of the back end processing of the first primitive when the front end geometry processing of the first primitive is completed.

17. The processing device of claim 9, wherein the back end processing comprises rasterization and pixel shading of the first primitive, and
the processor is further configured to begin execution of rasterization of the first primitive when the front end geometry processing of the first primitive is completed.

18. A non-transitory computer readable medium comprising instructions for causing a computer to execute a method of tiled rendering of an image for display comprising:
receiving an image comprising one or more three dimensional (3D) objects;
executing a visibility pass for determining locations of a plurality of primitives of the image in a first single-instruction-multiple-data (SIMD) unit;
when a determined location of a first primitive of the plurality of primitives is in a first tile of a plurality of tiles, processing, in the first SIMD unit, front end geometry of the primitive, the front end geometry processing occurring concurrently with the executing of the visibility pass for at least one of a remainder of the plurality of primitives; and
upon completion of the front end geometry processing of the first primitive, performing, in a second SIMD unit, back end processing of the first primitive, the performing occurring concurrently with the executing of the visibility pass for the at least one of the remainder of the plurality of primitives.

19. The computer readable medium of claim 18, wherein the instructions further comprise dividing the image into a plurality of tiles, and
the visibility pass comprises determining, for the plurality of primitives of each tile in the image, which tile a corresponding primitive is located.

20. The computer readable medium of claim 19, wherein when the location of the first primitive is determined not to be in the first tile, determining whether a location of a next primitive is in the first tile, and
when the location of the next primitive is determined to be in the first tile, beginning execution of the front end geometry processing of the next primitive.

* * * * *